United States Patent
Price et al.

(10) Patent No.: US 9,822,817 B2
(45) Date of Patent: Nov. 21, 2017

(54) HIGH SPEED BEARING ASSEMBLY

(71) Applicants: Rolls-Royce Corporation, Indianapolis, IN (US); Rolls-Royce North American Technologies, Inc., Indianapolis, IN (US)

(72) Inventors: Craig M. Price, Mooresville, IN (US); Andrew D. Copeland, Greenwood, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 15/076,119

(22) Filed: Mar. 21, 2016

(65) Prior Publication Data

US 2016/0319872 A1    Nov. 3, 2016

Related U.S. Application Data

(60) Provisional application No. 62/153,808, filed on Apr. 28, 2015.

(51) Int. Cl.
*F16C 33/66* (2006.01)
*F16C 33/38* (2006.01)
*F16C 33/46* (2006.01)
*F16C 19/06* (2006.01)
*F16C 37/00* (2006.01)

(52) U.S. Cl.
CPC ...... *F16C 33/6681* (2013.01); *F16C 33/3843* (2013.01); *F16C 33/3887* (2013.01); *F16C 33/467* (2013.01); *F16C 33/4623* (2013.01); *F16C 33/6677* (2013.01); *F16C 19/06* (2013.01); *F16C 37/007* (2013.01); *F16C 2360/23* (2013.01)

(58) Field of Classification Search
CPC .............. F16C 33/6681; F16C 33/3843; F16C 33/3887; F16C 33/4623; F16C 33/467; F16C 33/6677
See application file for complete search history.

(56) References Cited

U.S. PATENT DOCUMENTS

| | | |
|---|---|---|
| 3,066,990 A | 12/1962 | Frohlich |
| 6,132,094 A | 10/2000 | Cornelison et al. |
| 6,511,228 B2 * | 1/2003 | Dusza ................ F16C 33/6651 384/475 |
| 6,698,097 B1 | 3/2004 | Miura et al. |
| 6,827,494 B2 | 12/2004 | Aguilar |
| 6,969,235 B2 | 11/2005 | Feest |
| 7,470,064 B2 | 12/2008 | Link et al. |

(Continued)

FOREIGN PATENT DOCUMENTS

| | | |
|---|---|---|
| FR | 2444225 A1 | 7/1980 |
| JP | 2005 321047 A | 11/2005 |

OTHER PUBLICATIONS

Extended European Search Report, European Application No. 16163644.4-1751, dated Aug. 10, 2016, 7 pages.

*Primary Examiner* — Thomas R Hannon
(74) *Attorney, Agent, or Firm* — Barnes & Thornburg LLP

(57) ABSTRACT

A bearing assembly includes an outer race, a cage, a plurality of internal rotating members, and an inner race. Lubricant flows through the bearing assembly to withdraw heat generated during operation of the bearing assembly.

16 Claims, 2 Drawing Sheets

(56) References Cited

U.S. PATENT DOCUMENTS

| | | |
|---|---|---|
| 8,021,105 B2 | 9/2011 | Ammann et al. |
| 9,033,581 B2 * | 5/2015 | Carter .................. F16C 33/6677 384/475 |
| 2005/0047690 A1 | 3/2005 | Keramati et al. |
| 2006/0120646 A1 | 6/2006 | Suzuki |
| 2009/0294216 A1 | 12/2009 | Begin et al. |
| 2013/0087413 A1 | 4/2013 | Carter et al. |
| 2014/0116786 A1 | 5/2014 | Cooley et al. |
| 2014/0230422 A1 | 8/2014 | Placha |

\* cited by examiner

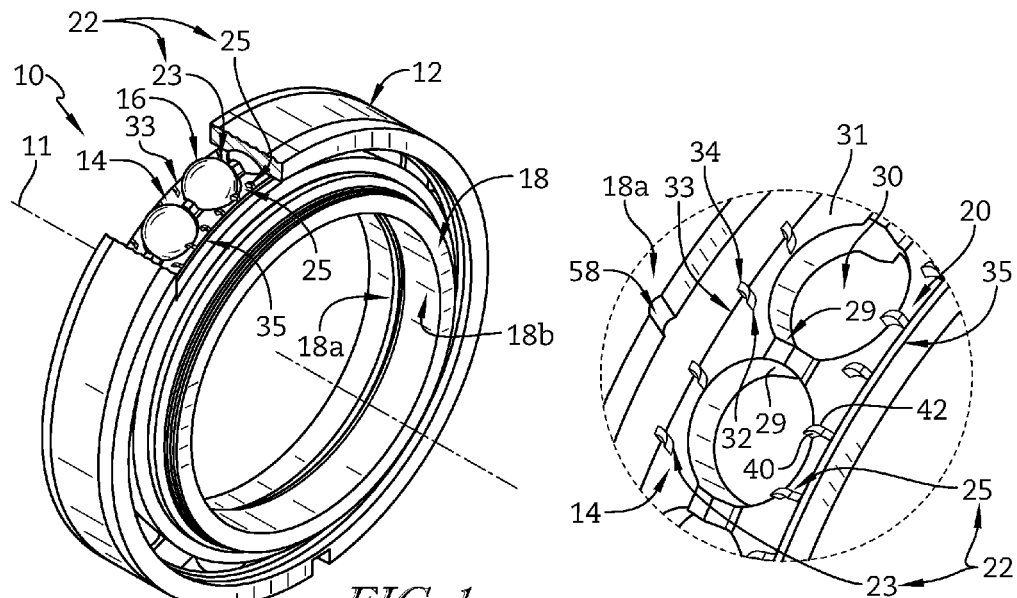
FIG. 1
FIG. 3
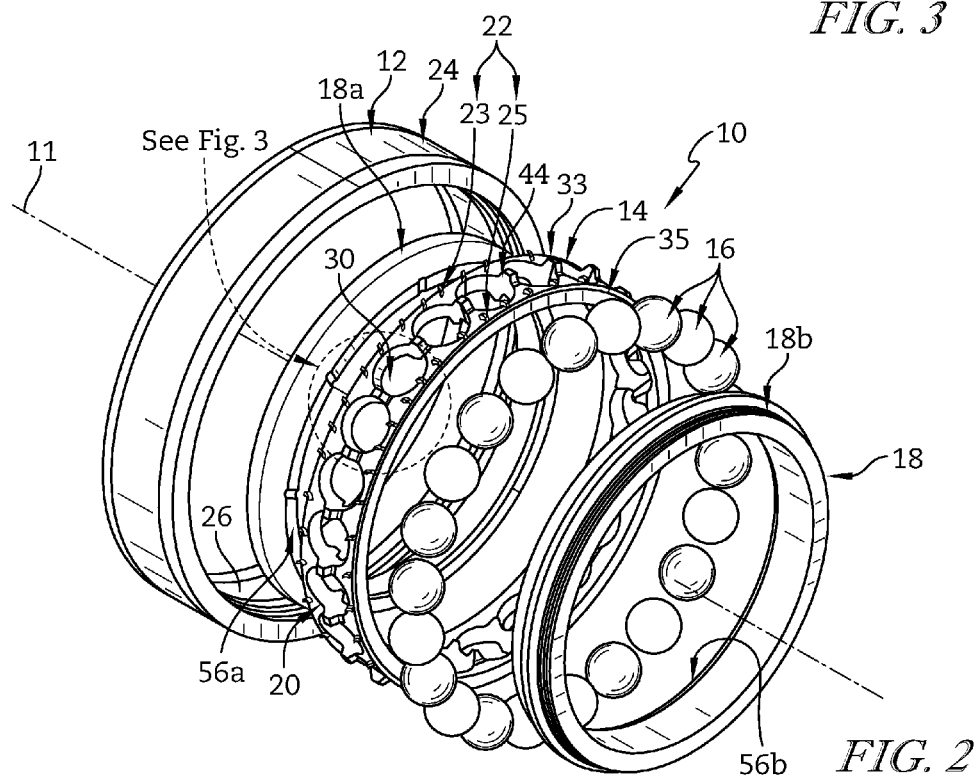
FIG. 2

HIGH SPEED BEARING ASSEMBLY

CROSS REFERENCE TO RELATED APPLICATIONS

This application claims priority to and the benefit of U.S. Provisional Patent Application No. 62/153,808, filed 28 Apr. 2015, the disclosure of which is now expressly incorporated herein by reference.

FIELD OF THE DISCLOSURE

The present disclosure relates to bearing assemblies, particularly those including internal rotating components such as balls or rollers. More particularly, the present disclosure relates to bearing assemblies that are lubricated during operation.

BACKGROUND

Bearing assemblies can generate significant amounts of heat during operation. Removing excess heat from a bearing assembly can be important to bearing operation and life span. To achieve the required cooling of a bearing assembly, one approach is to use a lubricant. Lubricants, such as oil, may be used to reduce friction in a bearing assembly during operation but can also remove heat from the assembly.

Cooled lubricant may be directed through a bearing assembly to remove heat from the bearing components, thereby cooling the bearing assembly. The heated lubricant flows out of the bearing assembly to various cooling devices where heat is removed from the lubricant. The cooled lubricant can then be returned to the bearing assembly to remove additional bearing assembly heat.

High speed bearing assemblies can generate particularly large amounts of heat. At higher speeds, bearing assembly temperatures can approach material design limits. Demands on the lubricant cooling system may thus increase significantly in high speed operation. Such increased lubricant cooling system demand may be limited thereby reducing available material design margins.

SUMMARY

The present disclosure may comprise one or more of the following features and combinations thereof.

According to the present disclosure, a bearing assembly may include an inner race that extends around a central axis, an outer race that extends around the central axis radially outward of the inner race, a plurality of internal rotating components arranged radially between the inner race and the outer race to engage the inner race and the outer race, and a cage that extends around the central axis radially between the inner race and the outer race. The cage may include a cage rail formed to include a plurality of apertures that receive the plurality of internal rotating components to locate the plurality of internal rotating components relative to one another within the bearing assembly.

In illustrative embodiments, the cage may include a plurality of lubricant-ejector fins. The lubricant-ejector fins may extend radially outward from the cage rail and may be shaped to push lubricant between the cage rail and the outer race out of the bearing assembly during rotation of the cage relative to the outer race in a direction of rotation. Thus, hot lubricant may be removed from the bearing assembly to make room for cooler lubricant introduced into the bearing assembly during rotation of the cage.

In illustrative embodiments, the plurality of lubricant-ejector fins may include forward-side fins arranged along an axially-forward side of the cage and aft-side fins arranged along an axially-aft side of the cage. Each of the lubricant-ejector fins may have a curved shape when viewed inwardly in a radial direction toward the central axis. The plurality of lubricant-ejector fins may be spaced axially apart from the plurality of apertures formed in the cage rail of the cage.

In illustrative embodiments, each of the plurality of lubricant-ejector fins may have a leading edge and a trailing edge. The leading edge may be arranged to engage lubricant present between the cage and the outer race ahead of the trailing edge during rotation of the cage relative to the outer race in the direction of rotation.

In illustrative embodiments, the trailing edge of each of the lubricant-ejector fins may be adjacent to an axially-forward side or an axially-aft side of the cage. The leading edge of each of the lubricant-ejector fins may be spaced axially from the trailing edge and circumferentially from the trailing edge in the direction of rotation.

In illustrative embodiments, plurality of lubricant-ejector fins may include forward-side fins arranged along an axially-forward side of the cage and aft-side fins arranged along an axially-aft side of the cage. Each of the lubricant-ejector fins may have a curved shape between the leading edge and the trailing edge when viewed inwardly in a radial direction toward the central axis.

In illustrative embodiments, the inner race may include a forward ring and an aft ring that cooperate to form a bearing surface engaged by the internal rotating components. The forward ring and the aft ring may also form a channel that extends radially through the inner race to provide a path for lubricant to enter the bearing assembly.

In illustrative embodiments, the internal rotating components may be balls or rollers.

According to another aspect of the present disclosure, a bearing assembly may include an inner race, an outer race, a plurality of internal rotating components arranged radially between the inner race and the outer race to engage the inner race and the outer race, and a cage located radially between the inner race and the outer race. The cage may include a cage rail that engages the plurality of internal rotating components.

In illustrative embodiments, the cage may include a plurality of lubricant-ejector fins that extend from the cage rail. The lubricant-ejector fins may each have a leading edge and a trailing edge. The leading edge may be arranged to engage lubricant present between the cage and the outer race ahead of the trailing edge during rotation of the cage relative to the outer race in a direction of rotation. The trailing edge may be spaced apart from the leading edge in an axial direction toward the nearer of an axially-forward side or an axially-aft side of the cage.

In illustrative embodiments, each of the lubricant-ejector fins may have a curved shape between the leading edge and the trailing edge when viewed inwardly in a radial direction toward the central axis.

In illustrative embodiments, the plurality of lubricant-ejector fins may include forward-side fins arranged along an axially-forward side of the cage and aft-side fins arranged along an axially-aft side of the cage.

In illustrative embodiments, the inner race may include a forward ring and an aft ring arranged axially adjacent to the forward ring so that the forward ring and the aft ring cooperate to form a bearing surface engaged by the internal rotating components and a channel that extends radially through the inner race to provide a path for lubricant to enter the bearing assembly.

According to another aspect of the present disclosure, a bearing assembly may include an inner race, an outer race, a plurality of internal rotating components arranged radially between the inner race and the outer race to engage the inner race and the outer race, and a cage located radially between the inner race and the outer race. The cage may include a cage rail.

In illustrative embodiments, the cage may also include a plurality of lubricant-ejector fins that extend from the cage rail. The lubricant-ejector fins may be shaped to push lubricant out of the bearing assembly.

In illustrative embodiments, the plurality of lubricant-ejector fins may include forward-side fins arranged along an axially-forward side of the cage and aft-side fins arranged along an axially-aft side of the cage.

In illustrative embodiments, each of the lubricant-ejector fins may have a curved shape when viewed inwardly in a radial direction toward the central axis.

In illustrative embodiments, the cage rail may be formed to include a plurality of apertures that receive the plurality of internal rotating components. The plurality of lubricant-ejector fins may be spaced axially apart from the plurality of apertures formed in the cage rail of the cage.

In illustrative embodiments, each of the plurality of lubricant-ejector fins may have a leading edge and a trailing edge. The leading edge may be spaced apart from an axially-forward side or an axially-aft side of the cage. The trailing edge may be arranged adjacent to the axially-forward side or the axially-aft side of the cage and may be spaced circumferentially from the leading edge around the cage.

In illustrative embodiments, each of the lubricant-ejector fins may have a curved shape between the leading edge and the trailing edge when viewed inwardly in a radial direction toward the central axis.

These and other features of the present disclosure will become more apparent from the following description of the illustrative embodiments.

BRIEF DESCRIPTION OF THE DRAWINGS

The detailed description particularly refers to the accompanying figures in which:

FIG. 1 is a perspective view of a bearing assembly with portions of an outer race cut away to show a portion of a cage having lubricant-ejector fins included in the bearing assembly;

FIG. 2 is an exploded perspective view of the bearing assembly of FIG. 1 showing that the bearing assembly includes a split inner race, an outer race, balls, and the cage having lubricant-ejector fins;

FIG. 3 is an enlarged view of the circled portion of FIG. 2 showing arrangement of the lubricant-ejector fins relative to ball-receiving openings formed in the cage;

DETAILED DESCRIPTION

Figure 4:
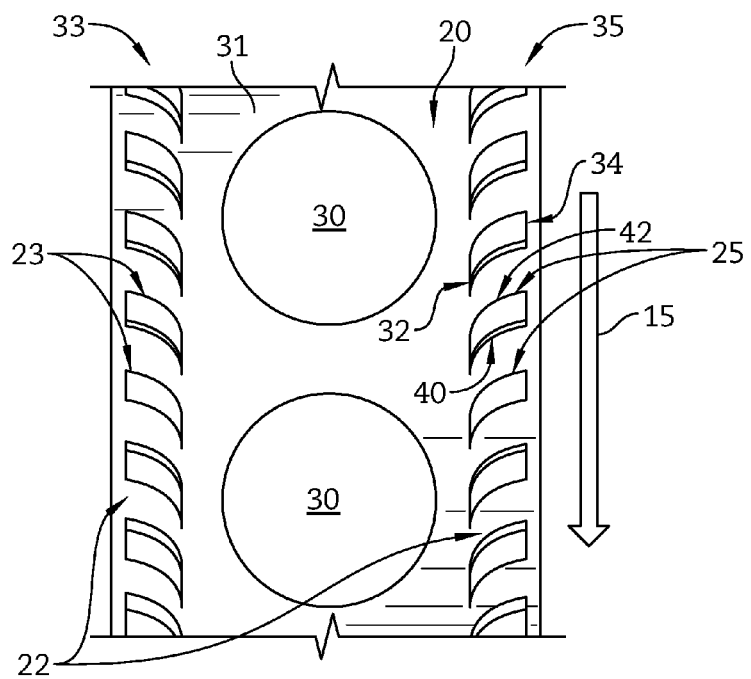
FIG. 4 is a plan view of a portion of the cage shown in FIGS. 1-3 showing that the lubricant-ejector fins are shaped to eject lubricant present in the bearing assembly when the cage moves in a predetermined direction of rotation.

An illustrative bearing assembly 10 is shown in FIG. 1. The bearing assembly 10 includes an outer race 12, a cage 14 for supporting rotating components adapt, a plurality of internal rotating members 16, and an inner race 18, each extending around a central axis 11. The outer race 12 is positioned radially outward of the inner race 18. The cage 14 and plurality of internal rotating members 16 are both positioned radially between the outer race 12 and the inner race 18 to facilitate rotation of the races 12,18 relative to one another. The cage 14 includes a cage rail 20 and a plurality of lubricant-ejector fins 22 extending radially from the cage rail 20 and configured to direct lubricant out from the bearing assembly 10.

Heat generated in bearing operation can be reduced where the lubricant-ejector fins 22 eject and or direct heated lubricant out of the bearing assembly 10 in favor of cooled lubricant from a cooled lubricant feed. The lubricant-ejector fins 22 reduce the amount of heat generated as a result of lubricant shearing within the bearing assembly 10 by reducing the repetition of lubricant shearing and reducing the volume of lubricant subjected to shearing during a pass through the bearing assembly 10. Reducing the amount of heat generated by operation of the bearing assembly 10 can improve the useful life of the bearing assembly 10.

Figure 5:
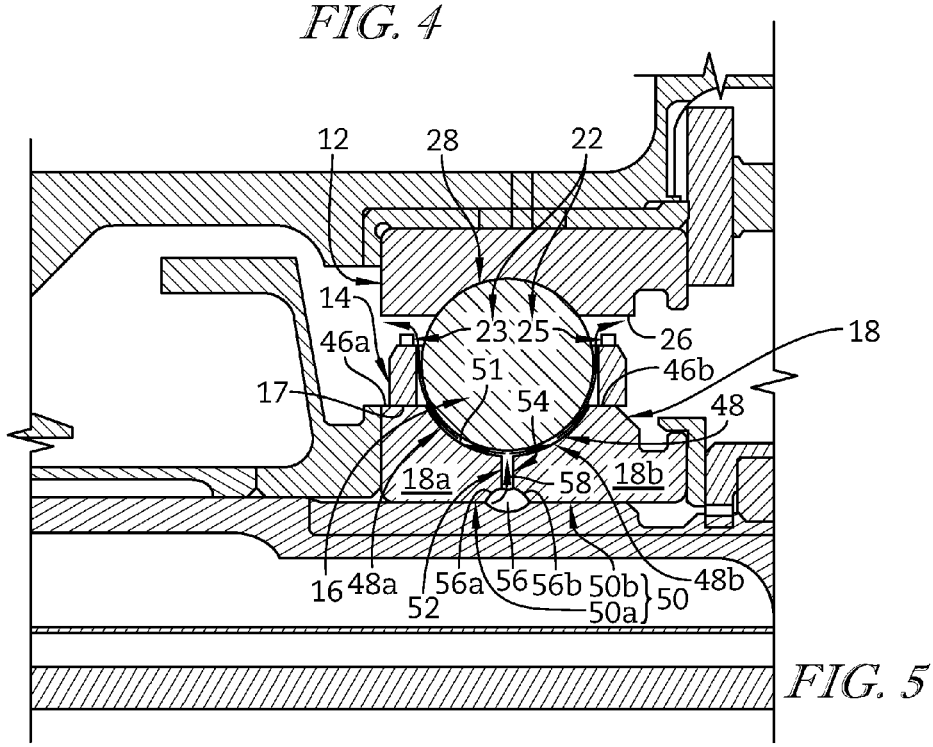
FIG. 5 is a cross-sectional view of a gas turbine engine sump assembly including the bearing assembly of FIGS. 1-4 and the relation between surfaces of the inner race, cage, and rotating members.

The outer race 12 of the illustrative embodiment extends around the central axis 11 as a single annular member as shown in FIG. 2. The outer race 12 defines a radially outer surface 24, and a radially inner surface 26. As shown in FIG. 5, the inner surface 26 includes an annular groove 28 that contacts the plurality of internal rotating members 16 and has a shape complimentary to the shape of the plurality of internal rotating members 16.

The cage 14 extends around the central axis and is formed as a single annular member as shown in FIG. 2. The cage 14 includes a cage rail 20 having a plurality of apertures 30 formed therethrough. Each aperture 30 is configured to receive one of the plurality of internal rotating members 16 to maintain the position of the internal rotating members 16 relative to one another within the bearing assembly 10.

The cage 14 of the illustrative embodiment also includes a plurality of lubricant-ejector fins 22 extending radially from the cage rail 20 and configured to direct lubricant out of the bearing assembly 10 as shown in FIGS. 1 and 2. The plurality of fins 22 include forward-side fins 23 and aft-side fins 25. The forward-side fins 23 are positioned on a radially outer surface 31 of the cage rail 20 adjacent to an axially forward side 33 of the cage 14. The aft-side fins 25 are positioned on the radially outer surface 31 of the cage rail 20 adjacent to an axially aft side 35 of the cage 14.

Each lubricant-ejector fin 22 has a leading edge 32 and a trailing edge 34 as shown in FIG. 3. The leading edge 32 of each fin 22 is illustratively located axially close to the apertures 30 and is spaced from axial sides 33,35 of the cage 14. Each leading edge 32 is arranged to engage lubricant between the cage 14 and the outer race 12 during rotation of the cage 14 relative to the outer race 12 in the direction of rotation 15 of the cage 14 to eject, push, flow, and or otherwise direct lubricant out of the bearing assembly 10. Each trailing edge 34 is spaced from the apertures 30 and is positioned axially adjacent to one of the axial sides 33,35 of the cage 14. Forward-side fins 23 have a trailing edge 34 axially adjacent to the axially forward side 33 of the cage 14. Aft-side fins 25 have a trailing edge 34 axially adjacent to the axially aft side 35 of the cage 14. The leading edge 32 of each fin 22 is located circumferentially forward of the trailing edge of the same fin 22 in the direction of rotation 15 as shown in FIG. 4.

Each lubricant-ejector fin 22 defines a curved shape from its leading edge 32 to its trailing edge 34 when viewed in the radial direction as shown in FIG. 4. Illustratively, each fin 22 has an concave arcuate shaped rotation side 40 facing the direction of rotation 15 and a convex arcuate shaped opposing side 42 facing in the direction opposite the direction of rotation 15. Illustratively, each concave arcuate shaped rotation side 40 has a straight radial length and is concavely curved along a path from its leading edge 32 to its trailing edge 34; and each convex arcuate shaped rotation side 42 has a straight radial length and convexly curved along a path from its leading edge 32 to its trailing edge 34.

In some embodiments, each fin 22 may have a predominantly straight, curved, other shape, and or any combination thereof from its leading edge 32 to trailing edge 34 when viewed in the radial direction. In some embodiments, each fin 22 may have a rotation side 40 and an opposing side 42 being shaped in any of straight, convex arcuate, concave arcuate, airfoil-shaped, or any other manner or combination thereof to facilitate flow of lubricant out from the bearing assembly 10. The radial lengths of either or both of the rotation side 40 and opposing side 42 may be straight, curved, or any combination thereof.

The lubricant-ejector fins 22 are illustratively positioned at equal circumferential intervals along the cage rail 20 as shown in FIG. 2. The plurality of lubricant-ejector fins 22 illustratively include an equal number of forward-side fins 23 and aft-side fins 25, and a single forward-side fin 23 and aft-side fin 25 is positioned at each circumferential interval. Each leading edge 32 and trailing edge 34 of the forward-side fins 23 is positioned with the same axial distance from the forward side 33 of the cage 14. Similarly, each leading and trailing edge 32,34 of aft-side fins 25 are positioned with the same axial distance from the aft side 35 of the cage 14.

Also shown in FIG. 4, the lubricant-ejector fins 22 have substantially equal sizes, shapes, and equally shaped rotation 40 and opposing 42 sides. However, the forward-side fins 23 have axially mirror-image shapes from those of aft-side fins 25 as shown in FIG. 4.

In some embodiments, fins 22 may be positioned at different circumferential intervals along the cage 14, may have different sizes, shapes, differently shaped rotation 40 and opposing 42 sides and or any combination thereof. The forward-side fins 23 may be positioned at different circumferential intervals along the cage 14, may have different sizes, shapes, differently shaped rotation 40 and opposing 42 sides, from that of aft-side fins 25. The forward-side fins 23 may be staggered when viewed radially such that the axial distance between the axially forward-side 33 of the cage 14 and either of the leading edge 32 and the trailing edge 32 of one aft-side fin 25 is different than the corresponding axial distance of another forward-side fin 23. The aft-side fins 25 may be staggered when viewed radially such that the axial distance between the axially aft-side 35 of the cage 14 and either of the leading edge 32 and the trailing edge 32 of one aft-side fin 25 is different than the corresponding axial distance of another aft-side fin 25.

The cage 14 includes apertures 30 formed as cylindrical holes extending radially through the cage rail 20 as shown in FIGS. 1 and 2. Each aperture 30 receives one of the internal rotating members 16 as shown in FIG. 5. The apertures 30 illustratively have a diameter slightly larger than the axial dimension of the corresponding internal rotating member 16 at the same radial position of the cage 14. In some embodiments, the apertures 30 may define any other shape complimentary to the shape of the respective internal rotating member 16 and may have any axial dimension relative to the corresponding internal rotating member 16 to permit rotation of the internal rotating member 16 while maintaining the positions of the internal rotating members 16 relative to each other.

The cage 14 includes a number of tabs 44 extending radially from the cage 14 as shown in FIG. 2. The tabs 44 are positioned between adjacent apertures 30 and define side surfaces 29 forming portions of each of the adjacent apertures 30. The tabs 44 illustratively include a radially outer tab 44 extending outward from the cage 14 between each of the adjacent apertures 30, and two tabs 44 extending radially inward from the cage 14 on either side of a plane which bisects the cage 14 orthogonally to the central axis 11. In some embodiments, any number of tabs 44 may be extend either outwardly or inwardly from the cage 14 and may be positioned in any manner to accommodate rotation of the internal rotating members 16.

The plurality of internal rotating members 16 are spherical (e.g., ball bearings) as shown in FIG. 5. Each of the internal rotating members 16 is positioned within a different one of the apertures 30 to locate the internal rotating members 16 relative to each other. Each internal rotating member 16 is supported for rotation by contact with each of the annular groove 28 of the outer race 12, and an outer bearing surface 48 of the inner race 18. In some embodiments, the internal rotating members 16 may be any other shape suitable for use in a bearing assembly 10.

The annular groove 28 of the outer race 12 has a smooth convex shape with a radius of curvature similar to that of the internal rotating members 16 (e.g., spherical negatively-shaped groove) as shown in FIG. 5. In some embodiments, the rotating members 16 may have another shape, for example cylinders (e.g., roller bearings or pin bearings) positioned longitudinally along the direction of the central axis, or any other shape suitable for rotating members within a bearing assembly; and the annular groove 28 may have any shape complimentary to the shape of the rotating members 16. In some embodiments, the outer race 12 may be a plurality of parts forming an annular member.

The inner race 18, as shown in FIG. 5, includes a forward ring 18a and an aft ring 18b forming a radially outer surface 46a,46b with the outer bearing surface 48 for engagement with the plurality of internal rotating members 16. The outer bearing surface 48 is a groove formed partly of bearing surface portion 48a of the forward ring 18a and partly of bearing surface portion 48b of the aft ring 18b. The bearing surface 48 is located between the radially outer surface portion 46a of the forward ring 18a and the radially outer surface portion 46b of the aft ring 18b.

The outer surface 46a,46b of the inner race 18 contacts radially inner surface 17 of the cage 14 as shown in FIG. 5. The inner race 18 includes a radially inner surface 50 formed partly of radially inner surface 50a of the forward ring 18a and partly of radially inner surface 50b aft ring 18b. The forward ring 18a has a circumferentially aft facing side 52 in contact with a circumferentially forward facing side 54 of aft ring 18b. The circumferentially aft facing side 52 of forward ring 18a has a groove 56a defined circumferentially along the length of an intersection between the circumferentially aft facing side 52 and radially inner side 50. The circumferential forward facing side 54 of the aft ring 18b has a groove 56b defined circumferentially along the length of an intersection between the circumferentially forward facing side 54 and the radially inner surface 50b. Grooves 56a,56b together form an annular groove channel 56 providing a communication passage for introduction of lubricant into the bearing assembly 10.

Each of the circumferentially aft facing side 52 of the forward ring 18a and circumferentially forward facing side 54 of the aft ring 18b extend radially from the annular groove channel 56 to the radially outer surface 46a,46b of the inner race 18 as shown in FIG. 5. The inner race 18 has radial grooves 58 positioned at circumferential intervals extending from the radially outer surface 46a,46b radially inward to the annular groove channel 56 at the interface between the circumferentially aft facing side 52 and the circumferentially forward facing side 54. The radial grooves 58 are each illustratively formed as a semi-circle axial groove in the circumferentially aft facing side 52 of the forward ring 18a, and provide a pathway for communication of lubricant between the annular groove channel 56 and the radially outer surface 46a,46b of the inner race 18.

The sub-parts of the inner race 18 including the outer bearing surface 48, annular groove channel 56, are illustratively formed by equal portions of forward ring 18a and aft ring 18b as shown in FIG. 5. The radial groove 58 is illustratively formed as a semi-circle groove only within the circumferential aft facing side 52 of forward ring 18a with the circumferential forward facing side 54 of aft ring 18b defining a flat side of the radial groove 58. In other embodiments, any one ring 18a,18b may form a disproportionate amount of any one or more subparts, including being wholly formed by a single ring 18a,18b; the shapes of grooves, channels, and communication pathways may be any shape suitable for their operation; and the radial groove 58 may be formed by a groove or grooves, any proportion of which being formed within either or both of the circumferential aft facing side 52 and the circumferential forward facing side 54.

The illustrative embodiment as shown in FIG. 5 also shows a suggestive travel path of lubricant, indicated by arrows 51, introduced into the bearing assembly 10 and then ejected from the bearing assembly 10 by the lubricant-ejector fins 22. Lubricant is fed to the annular groove channel 56 from a lubricant cooling system, and from annular groove channel 56 through the radial groove 58 to the outer bearing surface 48. A portion of lubricant travels along each of the forward 48a and aft 48b portions of the outer bearing surface 48, receiving heat along the way, to the radially outer surface 46a,46b, and then between the cage 14 and the rotating member 16 to the lubricant-ejector fins 22. The lubricant-ejector fins 22, while moving in the direction of rotation, eject and or direct the lubricant to the outside of the bearing assembly 10 promoting inflow of newly cooled lubricant from the lubricant cooling system as described above and inhibiting return flow of heated lubricant from outside the bearing assembly 10.

The illustrative embodiment as shown in FIG. 5, shows lubricant being fed through the inner race 18 from the radially inner direction of the bearing assembly 10 and a gap formed between the rotating members 16 and the outer bearing surface 48. In other embodiments the lubricant made be fed from any direction, including but not limited to other directions generally radially inward of the rotating members, and the lubricant feed structure (e.g., 56,58) or its portions can be repositioned and or reconfigured accordingly. In some embodiments, the gap illustrated between the rotating members 16 and the outer bearing surface 48 may be a very small gap and may be formed from surface variations and or differences in curvature between the rotating members 16 and the outer bearing surface 48.

In the illustrative embodiment, the bearing assembly 10 is a thrust bearing assembly for a gas turbine engine. The bearing assembly 10 including rotating members 16 are steel, and the lubricant is oil suitable for operation in high speed bearing operation. In some embodiments, the bearing assembly 10 may be a bearing assembly for any assembly of rotating components. In other embodiments, the bearing assembly 10 including rotating members 16 may be any suitable materials, with or without coatings, surface treatments, and or any other conditioning before, during, or after manufacturing, for operation in bearing assemblies, including hybrid combinations in which the materials of the rotating internal members and or other components are different from the materials of other components of the same bearing assembly. In some embodiments, the lubricant may be any lubricant suitable for operation in bearing assemblies including but not limited to synthetics.

High speed thrust bearings (>2 MDN) are becoming more relevant in aerospace gas turbine design due to the benefit of operating rotors at higher speeds. One of the major challenges in the thrust bearing design process is the amount heat a bearing may produce at these elevated speeds. Studies have shown that the majority (approximately 60%) of the heat generated by the high speed thrust bearing can be due to continuously shearing the oil present in the bearing cavity. Some rotor thrust bearings are starting to operate just below the lubricant's threshold temperature where coking starts to form. Hybrid thrust bearings (silicon nitride elements with steel rings) have been shown to operate at cooler temperatures than a traditional all steel bearing, but not significantly enough to provide increased margin to the lubricant's coking limit.

The bearing assembly 10 may be a hybrid thrust bearing with cage design features that are intended to help the oil escape the bearing cavity without being sheared repeatedly. The design features of the fins, disclosed herein, may resemble turbine blades on the outside diameter of the cage rail that will scoop and/or direct oil out of the bearing cavity. The presence of this feature may also help prevent oil from re-entering the bearing.

High speed thrust bearings (>2 MDN) are being used more prevalently in aerospace gas turbine design due to the benefits of operating rotors at higher speeds. With the features of the illustrative embodiment, the overall high speed thrust bearing metal temperatures may be reduced, which will increase the oil film thickness between the contact surfaces. The increased oil film thickness may translate into an improved fatigue life of the thrust bearing. The feature may benefit the oil cooling system since the amount of heat to be removed from the oil can be reduced. The amount of oil that is needed to cool the bearing also may be reduced.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:
1. A bearing assembly comprising
an inner race that extends around a central axis,
an outer race that extends around the central axis radially outward of the inner race,
a plurality of internal rotating components arranged radially between the inner race and the outer race to engage the inner race and the outer race, and
a cage that extends around the central axis radially between the inner race and the outer race, the cage including a cage rail formed to include a plurality of apertures that receive the plurality of internal rotating components to locate the plurality of internal rotating components relative to one another within the bearing assembly and a plurality of lubricant-ejector fins that extend radially outward from the cage rail that are shaped to push lubricant between the cage rail and the outer race out of the bearing assembly during rotation of the cage relative to the outer race in a direction of rotation so that hot lubricant is removed from the bearing assembly to make room for cooler lubricant introduced into the bearing assembly during rotation of the cage.

2. The bearing assembly of claim 1, wherein the plurality of lubricant-ejector fins include forward-side fins arranged along an axially-forward side of the cage and aft-side fins arranged along an axially-aft side of the cage.

3. The bearing assembly of claim 2, wherein each of the lubricant-ejector fins has a curved shape when viewed inwardly in a radial direction toward the central axis.

4. The bearing assembly of claim 2, wherein the plurality of lubricant-ejector fins are spaced axially apart from the plurality of apertures formed in the cage rail of the cage.

5. The bearing assembly of claim 1, wherein each of the plurality of lubricant-ejector fins has a leading edge and a trailing edge, and the leading edge arranged to engage lubricant present between the cage and the outer race ahead of the trailing edge during rotation of the cage relative to the outer race in the direction of rotation.

6. The bearing assembly of claim 5, wherein the trailing edge of each of the lubricant-ejector fins is adjacent to an axially-forward side or an axially-aft side of the cage and the leading edge of each of the lubricant-ejector fins is spaced axially from the trailing edge and circumferentially from the trailing edge in the direction of rotation.

7. The bearing assembly of claim 6, wherein the plurality of lubricant-ejector fins include forward-side fins arranged along an axially-forward side of the cage and aft-side fins arranged along an axially-aft side of the cage.

8. The bearing assembly of claim 6, wherein each of the lubricant-ejector fins has a curved shape between the leading edge and the trailing edge when viewed inwardly in a radial direction toward the central axis.

9. The bearing assembly of claim 1, wherein the inner race includes a forward ring and an aft ring that cooperate to form a bearing surface engaged by the internal rotating components and to form a channel that extends radially through the inner race to provide a path for lubricant to enter the bearing assembly.

10. The bearing assembly of claim 1, wherein the internal rotating components are balls or rollers.

11. A bearing assembly comprising
an inner race,
an outer race,
a plurality of internal rotating components arranged radially between the inner race and the outer race to engage the inner race and the outer race, and
a cage located radially between the inner race and the outer race, the cage including a cage rail that engages the plurality of internal rotating components and a plurality of lubricant-ejector fins that extend from the cage rail,
wherein the lubricant-ejector fins each have a leading edge and a trailing edge, the leading edge is arranged to engage lubricant present between the cage and the outer race ahead of the trailing edge during rotation of the cage relative to the outer race in a direction of rotation, and the trailing edge spaced apart from the leading edge in an axial direction toward the nearer of an axially-forward side or an axially-aft side of the cage,
wherein each of the lubricant-ejector fins has a curved shape between the leading edge and the trailing edge when viewed inwardly in a radial direction toward the central axis.

12. The bearing assembly of claim 11, wherein the plurality of lubricant-ejector fins include forward-side fins arranged along an axially-forward side of the cage and aft-side fins arranged along an axially-aft side of the cage.

13. The bearing assembly of claim 11, wherein the inner race includes a forward ring and an aft ring arranged axially adjacent to the forward ring so that the forward ring and the aft ring cooperate to form a bearing surface engaged by the internal rotating components and a channel that extends radially through the inner race to provide a path for lubricant to enter the bearing assembly.

14. A bearing assembly comprising
an inner race,
an outer race,
a plurality of internal rotating components arranged radially between the inner race and the outer race to engage the inner race and the outer race, and
a cage located radially between the inner race and the outer race, the cage including a cage rail and a plurality of lubricant-ejector fins that extend from the cage rail, the lubricant-ejector fins shaped to push lubricant out of the bearing assembly, each of the plurality of lubricant-ejector fins has a leading edge and a trailing edge, and the leading edge arranged to engage lubricant present between the cage and the outer race ahead of the trailing edge during rotation of the cage relative to the outer race in the direction of rotation, the trailing edge of each of the lubricant-ejector fins is adjacent to an axially-forward side or an axial-aft side of the cage and the leading edge of each of the lubricant-ejector fins is spaced axially from the trailing edge and circumferentially from the trailing edge in the direction of rotation,
wherein each of the lubricant-ejector fins has a curved shape between the leading edge and the trailing edge when viewed inwardly in a radial direction toward the central axis.

15. The bearing assembly of claim 14, wherein the plurality of lubricant-ejector fins include forward-side fins arranged along the axially-forward side of the cage and aft-side fins arranged along the axially-aft side of the cage.

16. The bearing assembly of claim 14, wherein the cage rail is formed to include a plurality of apertures that receive the plurality of internal rotating components and the plurality of lubricant-ejector fins are spaced axially apart from the plurality of apertures formed in the cage rail of the cage.

* * * * *